United States Patent [19]

Nelson

[11] Patent Number: 5,210,453
[45] Date of Patent: May 11, 1993

[54] THROUGH BOLT RESONANCE SUPPRESSION IN AN ALTERNATOR

[75] Inventor: David A. Nelson, Union Lake, Mich.

[73] Assignee: Ford Motor Company, Dearborn, Mich.

[21] Appl. No.: 645,924

[22] Filed: Jan. 25, 1991

[51] Int. Cl.⁵ .................. H02K 5/00; F16B 39/24
[52] U.S. Cl. ........................ 310/51; 310/89; 310/91; 411/399
[58] Field of Search .............. 310/51, 89, 91, 112, 310/263, 254, 259, 272, 273; 411/399, 378, 426

[56] References Cited

U.S. PATENT DOCUMENTS

| | | | |
|---|---|---|---|
| 1,411,442 | 4/1922 | Leece | 310/89 |
| 1,784,624 | 12/1930 | Ford | 310/40 R |
| 2,701,398 | 2/1955 | Bohmer | 411/378 |
| 3,145,362 | 8/1964 | Kleven | 411/399 |
| 3,150,278 | 9/1964 | Clark | 310/89 |
| 3,500,084 | 3/1970 | Ito et al. | 310/51 |
| 3,512,446 | 5/1970 | Sekhon | 411/399 |
| 3,538,362 | 11/1970 | Cheetham et al. | 310/68 |
| 3,828,422 | 8/1974 | Schmitt | 411/378 |
| 4,032,806 | 6/1977 | Seely | 310/50 |
| 4,055,778 | 10/1977 | Binder | 310/89 |
| 4,100,440 | 7/1978 | Binder et al. | 310/89 |
| 4,202,242 | 5/1980 | Champoux et al. | 411/361 |
| 4,293,788 | 10/1981 | Binder | 310/227 |
| 4,339,871 | 7/1982 | Magnaghi | 29/596 |
| 4,835,428 | 5/1989 | Komurasaki et al. | 310/68 D |
| 4,842,467 | 6/1989 | Armstrong | 411/399 |
| 4,941,787 | 7/1990 | Shaffer | 411/136 |

Primary Examiner—R. Skudy
Assistant Examiner—D. R. Haszko
Attorney, Agent, or Firm—Paul K. Godwin, Jr.; Roger L. May

[57] ABSTRACT

Thirty-sixth order harmonic noise generation is suppressed in an automotive-type alternator generator by forming a countersink in the leading edge of a through bolt bore to provide a transversely abutting conical surface to the flange of a through bolt which is used to retain the housing elements.

3 Claims, 2 Drawing Sheets

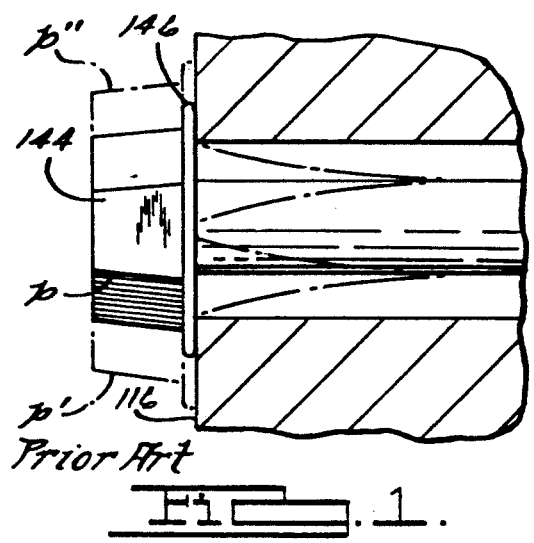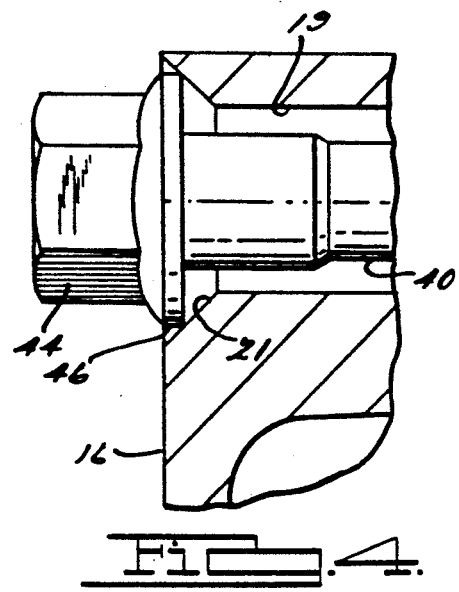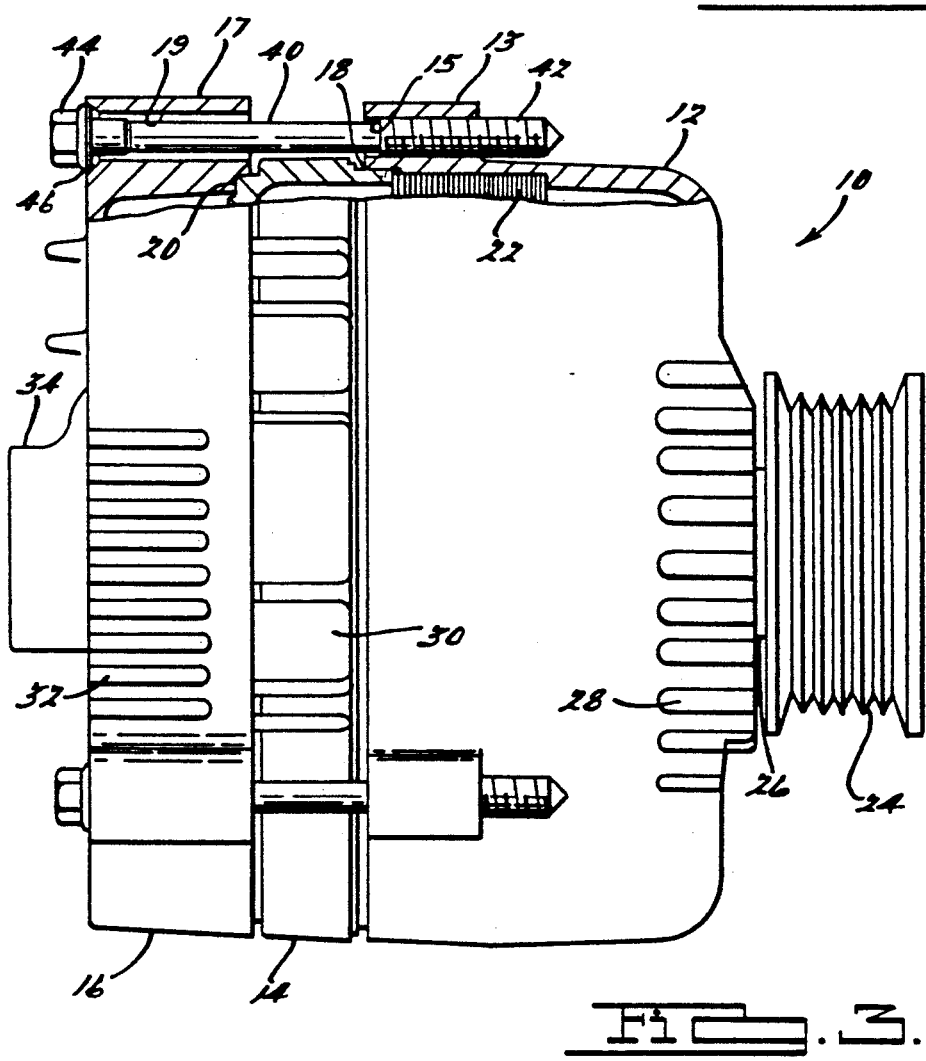

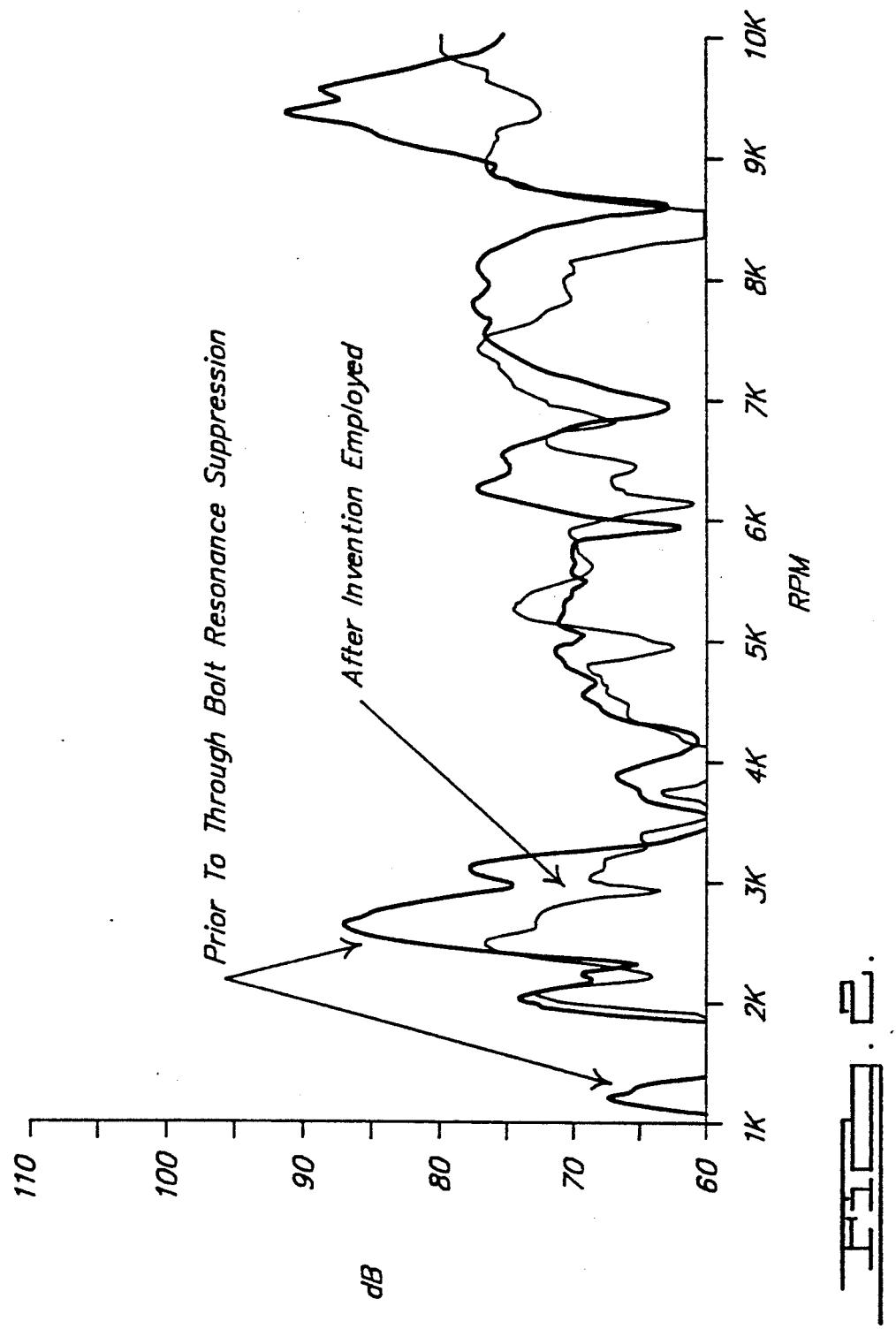

THROUGH BOLT RESONANCE SUPPRESSION IN AN ALTERNATOR

BACKGROUND OF THE INVENTION

1. Field of the Invention

The present invention is directed to the field of alternator generator construction and more specifically to the area of reducing noise generated in such devices.

2. Description of the Prior Art

In alternators and generators of conventional design, such as those shown in U.S. Pat. Nos. 3,538,362 and 4,835,428 the metal housing shells which enclose the stator, rotor and bearings are usually held together with bolts extending in a direction parallel to the axis of the rotor. Bolts are inserted through aligned apertures formed in the two housings so that the threads of each bolt are mated with threads in one of the apertures. The head of each bolt applies pressure to a flush surface below its circular flange that forces the two housing shell pieces into compression.

Excessive noise problems have been encountered with that type of alternator housing connection technique due to back emf pulsation pressures present on the stator during certain speeds of rotation. Specifically, it has been found that at certain speeds the bolts are caused to vibrate at their own resonant frequencies. When this occurs, the bolt head is caused to go into lateral oscillatory motion as shown in FIG. 1. In that drawing, the tooled mass which forms the bolt head 144 is shown with a circular flange 146 that is tightened to be in contact with the surface of housing 116. During most operational speeds of the associated alternator, bolt head 144 remains in the position p. At a rotational speed of approximately 1100 RPM, the through bolt 140 vibrates at its peak resonance and bolt head 144 oscillates between p' and p". In FIG. 4, the 36th order harmonic noise attributed to the through bolt resonance vibration is plotted in the heavy line. The plot shows an approximately 68 DB peak at about 1100 rpm. With a frequency of approximately 660 Hz, the vibrations are well within the audio range. It is most desireable to reduce or eliminate such noise.

SUMMARY OF THE INVENTION

The present invention is intended to reduce the level of audio noise produced by an electrical alternator generator.

The present invention achieves significant noise reduction by suppressing the vibration of through bolts in a relatively simple and low cost manner. The invention achieves a dramatic suppression in the noise level by providing a countersunk aperture with a transversely abutting conical surface to contact the through bolt head and prevent lateral movement of the bolt head throughout the range of operating speeds encountered by the alternator.

BRIEF DESCRIPTION OF THE DRAWINGS

FIG. 1 is an elevational cross section of a typically conventional through bolt mounting configuration.

FIG. 2 is a plot of noise level versus operating speed of an alternator for both nonsuppressed and suppressed through bolts.

FIG. 3 is an elevational view of an alternator generator incorporating the present invention.

FIG. 4 is a detailed cross-sectional view of the present invention shown in FIG. 3.

DETAILED DESCRIPTION OF THE PREFERRED EMBODIMENT

In FIG. 3, an alternator generator 10 is shown as having a plurality of hollow elements 12, 14 and 16 which are generally cylindrical in shape and together form the alternator housing. Housing element 12 is a generally cup-shaped casting about a central axis with a circular mating edge 18 at one end and a bearing support aperture (not shown) formed in the other end. A plurality of cooling holes 28 are formed in the housing element 12 to allow for a rotor mounted fan to circulate air through the housing element. Housing element 12 retains a relatively fixed stator 22 and also surrounds a rotor (not shown) mounted on a shaft 26. The shaft 26 is supported for rotation in the housing 12 and in a bearing support 34 formed in housing element 16. In this configuration, housing element 12, surrounds the stator and the rotor portions of the alternator. The rotor is rotationally driven on pulley 24 to generate alternating current. Cylindrically shaped housing element, 14 is mated along circular edge 18 to housing element 12. Large apertures 30 are provided in the housing portion 14 to surround a second rotor mounted cooling fan (not shown). Housing element 16 is also a generally cup-shaped casting and is mated along a circular edge 20 at one end with the intermediately located housing element 12. A bearing support 34 is located at the other end of housing element 16. House element 16 contains cooling apertures 32 and is configured in a manner to house a rectifier assembly that converts the AC to DC for use in an associated automotive vehicle.

Several through bolts 40 are used to compress the three housing elements 12, 14 and 16 together at circular edge joints 18 and 20. Generally an alternator of this type has three or more through bolts evenly distributed around the housing to provide even compression on the joints. In FIG. 3 two of the through bolts are shown installed on the alternator 10. Housing element 12 contains several bosses 13 which extend outwardly from the cylindrical housing. Each boss 13 contains a threaded bore 15 that is oriented approximately parallel to the cylindrical axis of the housing 12. Housing element 16 contains corresponding bosses 17 which contain unthreaded bores 19 that are axially aligned with bores 15 immediately prior to assembly. The leading opening of bore 19 is configured as a countersink 21 at approximately 45 degrees. The countersink is large enough to provide an abutting surface to the circular flange 46 extending from the tooled mass bolt head 44 (see FIG. 4). In this case, the tooled mass bolt head 44 is a multifaceted head with a hexagonal cross section.

The present invention achieves a significant reduction in 36th order harmonic noise generated by the alternator and is demonstrated in the plot of FIG. 2. The narrow lined plot is of the noise generated over a wide range of operational speeds with the countersink employed in the alternator housing and the bolt tightened so that the flange 46 of the bolt head abuts the conical surface 21 and its lateral movement was prevented. While the overall noise generated by the alternator is significantly reduced, it is specifically noted that in the 1100 RPM range the noise pulse attributed to the through bolt resonance was significantly suppressed to below 60 DB.

It will be apparent that many modifications and variations may be implemented without departing from the scope of the novel concept of this invention Therefore, it is intended by the appended claims to cover all such modifications and variations which fall within the true spirit and scope of the invention.

I claim:

1. An alternator for generating electrical energy for use in an automotive vehicle comprising:
   a housing defined by a plurality of hollow cylindrical housing elements that mate along opposing and substantially circular edges;
   a plurality of unthreaded apertures in one of said housing elements in axial alignment with threaded apertures in another of said housing elements wherein said plurality of aligned apertures are in parallel alignment with the axis of said cylindrical housing elements;
   a plurality of bolts, having threads on one end and a circular flanged tooled mass on the other end, extending through said axially aligned unthreaded and threaded apertures to compress the mating of said plurality of cylindrical housing elements at their opposing edges; and
   each of said unthreaded apertures being countersunk to provide a transversely abutting conical surface that is contacted only by the circular flange of the tooled mass on a bolt installed therein to prevent noise from being generated due to lateral movement of said tooled mass with respect to said unthreaded aperture when subjected to vibration.

2. An alternator as claimed in claim 1, wherein said tooled mass of said bolts is a hexagonal faceted head with said circular flange extending outward from the facets to contact said countersink surface of a corresponding one of said unthreaded apertures.

3. An improved alternator for generating electrical energy for use in an automotive vehicle comprising:
   a plurality of hollow cylindrical housing elements that mate along opposing and substantially circular edges;
   a plurality of unthreaded apertures in one of said housing elements in axial alignment with threaded apertures in another of said housing elements wherein said plurality of aligned apertures are in parallel alignment with the axis of said cylindrical housing elements;
   a plurality of bolts, having threads on one end and a circular flanged tooled mass on the other end, extending through said axially aligned unthreaded and threaded apertures to compress the mating of said plurality of cylindrical housing elements at their circular edges; wherein said improvement comprises:
   means for preventing vibration forces on the circular flange of the said tooled mass of each bolt installed therein from causing lateral movement of said tooled mass with respect to said unthreaded aperture and corresponding noise generation: wherein said preventing means is a countersink in each unthreaded aperture to provide a transversely abutting surface which contacts only the circular flange of the tooled mass on each bolt installed therein and prevents lateral movement of said tooled mass with respect to said unthreaded aperture.

* * * * *